(12) United States Patent
Sugiyama et al.

(10) Patent No.: US 7,326,916 B2
(45) Date of Patent: Feb. 5, 2008

(54) OPTICAL SUBMARINE TRANSMISSION SYSTEM

(75) Inventors: Akira Sugiyama, Kawasaki (JP); Taiichi Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/394,114

(22) Filed: Mar. 31, 2006

(65) Prior Publication Data
US 2007/0138417 A1    Jun. 21, 2007

(30) Foreign Application Priority Data
Dec. 19, 2005    (JP) .............................. 2005-365000

(51) Int. Cl.
*G01J 1/04*     (2006.01)
*H04B 10/00*    (2006.01)

(52) U.S. Cl. ........................... 250/227.14; 250/227.15; 250/227.24; 398/17; 398/104

(58) Field of Classification Search .............................. 250/227.14–227.16, 227.24, 227.28; 398/17–21, 398/104–105; 385/9, 13
See application file for complete search history.

(56) References Cited

U.S. PATENT DOCUMENTS 6,504,630 B1    1/2003    Czarnocha et al.

7,113,706 B2 *    9/2006    Feinberg ...................... 398/104

FOREIGN PATENT DOCUMENTS

| JP | 5-206893 | 8/1993 |
| JP | 5-316043 | 11/1993 |
| JP | 7-336296 | 12/1995 |
| JP | 2000-174706 | 6/2000 |

* cited by examiner

*Primary Examiner*—Kevin Pyo
(74) *Attorney, Agent, or Firm*—Staas & Halsey LLP

(57) ABSTRACT

A main line cable and a backup line cable are laid in a land portion in different routes. A land terminal station includes a break detecting unit that detects a break of the main line cable, and a path switching unit that switches a transmission path to the backup line cable. The break detecting unit detects a break of the cables based on a received-light level of a main signal transmitted from an underwater cable, or based on a received-light level of a returned monitor signal that has been output by the break detecting unit and reflected by the beach manhole. The beach manhole includes optical couplers that couple and divide the main signal for the main line cable and the backup line cable, a fiber grating that reflects the monitor signal, and an optical director.

14 Claims, 9 Drawing Sheets

OPTICAL SUBMARINE TRANSMISSION SYSTEM

CROSS-REFERENCE TO RELATED APPLICATIONS

This application is based upon and claims the benefit of priority from the prior Japanese Patent Application No. 2005-365000, filed on Dec. 19, 2005, the entire contents of which are incorporated herein by reference.

BACKGROUND OF THE INVENTION

1. Field of the Invention

The present invention relates to an optical submarine transmission system.

2. Description of the Related Art

FIG. 9 is a schematic of a conventional optical submarine transmission system. As shown in FIG. 9, in the optical submarine transmission system, cables 5, 6 laid in a land portion between land terminal stations 1 and 2 and beach manholes 3 and 4 are connected to a cable 7 laid in an underwater portion at the beach manholes 3 and 4. Black points in the beach manholes 3 and 4 represent connection points of the cables. A relay 8 is provided in the middle of the cable 7 in the underwater portion. A fiber that transmits signals from a land terminal station A1 to a land terminal station B2 and a fiber that transmits signals from the land terminal station B2 to the land terminal station A1 are depicted with a single cable.

In the conventional optical submarine transmission system, a backup line is laid in addition to a line that is usually used (hereinafter, "main line"). Therefore, the conventional system does not have a redundancy to be able to switch to the backup line when a fault occurs in the main line. It is preferable to configure the line to be redundant so that communication of signals can be performed without delay even when a fault occurs in the main line.

Recently, an output power of land terminal stations has improved according to improvement of an optical amplifier technology. Therefore, a long distance communication has become possible, as a result, the distance of land portions are lengthened. However, to lengthen the line of the land portion, it becomes more likely to cause faults on cables in the land portion due to external factors such as a construction. Also in this regard, redundancy of lines is desired.

Japanese Patent Application Laid-Open Publication No. 1993-206893 discloses an automatic switching method. In this method, a backup optical transmission path constituted of an optical transmission unit, an optical receiving unit, and an optical fiber connecting those two units is provided only in one downlink line from a control station to a base station. When an optical transmission path in any one of sectors has a fault, the optical transmission path is automatically switched to the backup optical transmission path. Thus, the optical transmission path is secured. A method of remedying a double fault in an optical transmission system is disclosed in Japanese Patent Application Laid-Open Publication No. 1993-316043. The optical transmission system includes a first optical switching unit that executes selection of a currently used optical transmitting unit and a backup optical transmitting unit and selection of a currently used optical transmitting unit and a backup optical receiving unit; a second optical switching unit connected to the first optical switching unit on one end and with a first to a fourth optical transmission paths on the other end through an optical dividing unit, and adapted to switch the optical transmission paths such that optical signals are transmitted and received using normally the first and the second optical transmission path, using, when any one of the first and the second optical transmission path is disconnected, the other optical transmission path and the third optical transmission path and using, when any one of the first and the second optical transmission path and the third optical transmission path are disconnected, the other optical transmission path and the fourth optical transmission path; and the optical dividing unit. In an optical transmission method disclosed in Japanese Patent Application Laid-Open Publication No. 1995-336296, each of subscriber apparatuses includes a transmission path fault monitoring unit for each of a currently-used-system and a backup-system, and a subscriber-apparatus star coupler. A fault is detected by receiving optical signals each having a different wavelength for each of the currently-used-system path and the backup-system transmission path.

A method of making a line redundant in an optical submarine transmission system is shown in FIG. 10. FIG. 10 is a schematic of the optical submarine transmission system that is fully duplex. As shown in FIG. 10, it can be considered that cables 9, 10, and 11 of a backup line (hereinafter, "backup line cable") in addition to cables 5, 6, and 7 of a main line (hereinafter, "main line cable") are laid in not only land portions but also in an underwater portion. Thus, the entire line between the land terminal station A1 and the land terminal station B2 is made duplex. However, the construction for the cable 11 and the relay 12 to be submerged requires tremendous costs. Therefore, it can be considered that only the line in the land portion is made duplex by laying a main line cable and a backup line cable between a beach manhole and a land terminal station. In this case, an optical switch for switching the lines is necessary.

However, space inside a beach manhole is limited and no commercial electric power is supplied to beach manholes. Therefore, active parts, such as an optical switch, cannot be installed in the beach manhole. Therefore, a line in a land portion between a beach manhole and a land terminal station can not be configured to be duplex. As shown in FIG. 10, for each of the main line and the backup line, a fiber for transmitting signals from the land terminal station A1 to the land terminal station B2 and a fiber for transmitting signals from the land terminal station B2 to the land terminal station A1 are combined to be depicted as one cable. In other words, the above conventional methods do not consider restrictions specific to an optical submarine transmission system.

SUMMARY OF THE INVENTION

It is an object of the present invention to at least solve the above problems.

An optical submarine transmission system according to one aspect of the present invention includes a main line cable laid between a land terminal station and a beach manhole, and connected to an underwater cable in the beach manhole; a backup line cable laid between the land terminal station and the beach manhole in a different route from a route in which the main line cable is laid, and connected to the underwater cable in the beach manhole; a break detecting unit arranged in the land terminal station, and configured to detect a break of the main line cable; a path switching unit arranged in the land terminal station, and configured to switch an optical transmission path from the main line cable to the backup line cable when the break detecting unit detects the break.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
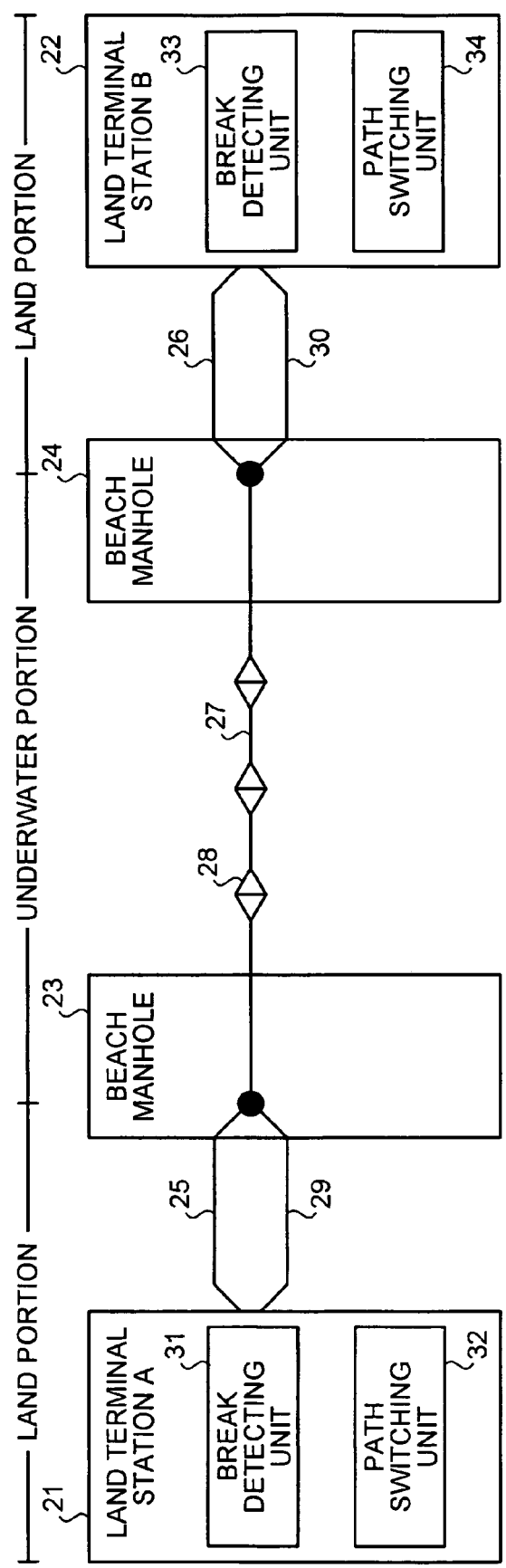
FIG. 1 is a schematic of an optical submarine transmission system according the present invention.
Figure 2:
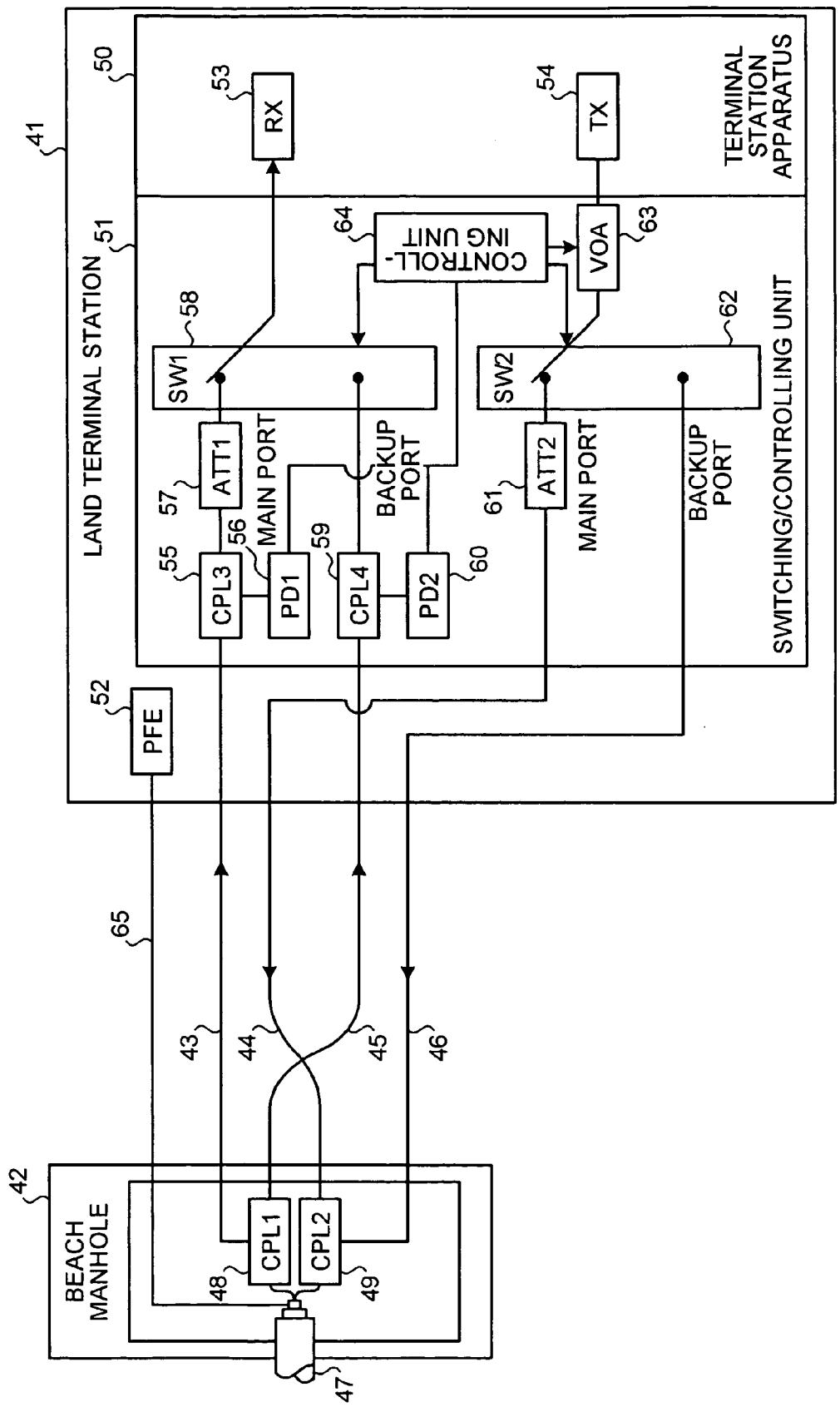
FIG. 2 is a block diagram of a configuration of a land portion in an optical submarine transmission system according to a first embodiment of the present invention.

FIG. 2 is a block diagram of configuration of a land portion in an optical submarine transmission system according to a first embodiment. As shown in FIG. 2, a reception cable 43 (hereinafter, "main reception cable 43") and a transmission cable 44 (hereinafter, "main transmission cable 44") of a main line cable, and a reception cable 45 (hereinafter, "backup reception cable 45") and a transmission cable 46 (hereinafter, "backup transmission cable 46") of a backup line cable are laid between a land terminal station 41 and a beach manhole 42. The main line cables and the backup line cables are laid in geographically different routes.

A reception cable of a cable 47 in the underwater portion (hereinafter, "underwater cable 47") is connected to an input terminal of a first optical coupler (CPL1) 48 provided in a beach manhole 42. The main reception cable 43 is connected to one output terminal of the first optical coupler 48. The backup reception cable 45 is connected to the other output terminal of the first optical coupler 48. The first optical coupler 48 has a function as an optical dividing unit that divides a main signal transmitted from the underwater cable 47, into a signal to the main reception cable and a signal to the backup reception cable 45. Not especially limited, however, the wavelength of the main signal is 1.55 micrometer (μm) that is generally used in optical submarine transmission systems.

The main transmission cable 44 is connected to one input terminal of a second optical coupler (CPL2) 49 provided to the beach manhole 42. The backup transmission cable 46 is connected to the other input terminal of the second optical coupler 49. An output terminal of the second optical coupler 49 is connected to a transmission cable of the underwater cable 47. The second optical coupler 49 has a function as an optical coupling unit that couples the main transmission cable 44 and the backup transmission cable 46 with the underwater cable 47.

A land terminal station 41 includes a terminal station apparatus 50, a switching/controlling unit 51, and a power feeding equipment (PFE) 52. The terminal station apparatus 50 has a receiver (RX) 53 and a transmitter (TX) 54. The switching/controlling unit 51 includes a third optical coupler (CPL3) 55, a first photodiode (PD1) 56, a first optical attenuator (ATT1) 57, a first optical switch (SW1) 58, a fourth optical coupler (CPL4) 59, a second photodiode (PD2) 60, a second optical attenuator (ATT2) 61, a second optical switch (SW2) 62, a variable optical attenuator (VOA) 63, and a controlling unit 64.

The main reception cable 43 is connected to an input terminal of the third optical coupler 55. One output terminal of the third optical coupler 55 is connected to the optical receiving side of the first photodiode 56. An output voltage of the first photodiode 56 is supplied to the controlling unit 64. The other output terminal of the third optical coupler 55 is connected to a main port of the first optical switch 58 through the first optical attenuator 57. This first optical attenuator 57 is provided to correct the difference between a transmission loss of the main reception cable 43 and a transmission loss of the backup reception cable 45. The backup reception cable 45 is connected to an input terminal of the fourth optical coupler 59.

One output terminal of the fourth optical coupler 59 is connected to the optical receiving side of the second photodiode 60. An output voltage of the second photodiode 60 is supplied to the controlling unit 64. The other output terminal of the fourth optical coupler 59 is connected to a backup port of the first optical switch 58. The main port or the backup port of the first optical switch 58 is exclusively connected to the receiver 53 by switching therebetween. The controlling unit 64 controls the switching of the first optical switch 58 based on the output voltages of the first photodiode 56 and the second photodiode 60.

An input terminal of the variable optical attenuator 63 is connected to the transmitter 54. An output terminal of the variable optical attenuator 63 is exclusively connected to a main port or to a backup port of the second optical switch 62 by switching therebetween. The controlling unit 64 controls the switching of the second optical switch 62 and the attenuation amount of the variable optical attenuator 63 based on output voltages of the first photodiode 56 and the second photodiode 60.

The main transmission cable 44 is connected to a main port of the second optical switch 62 through the second optical attenuator 61. This second optical attenuator 61 is provided to correct the difference between a transmission loss of the main transmission cable 44 and a transmission loss of the backup transmission cable 46. The backup transmission cable 46 is connected to the backup port of the second optical switch 62. The third optical coupler 55, the first photodiode 56, the fourth optical coupler 59, the second photodiode 60, and the controlling unit 64 have a function as a break detecting unit that detects breaks of the main reception cable 43 and the backup reception cable 45.

The first optical switch 58, the second optical switch 62, and the controlling unit 64 have a function as a path switching unit that switches the optical transmission path in the land portion from the main reception cable 43 and the main transmission cable 44 to the backup reception cable 45 and the backup transmission cable 46 when the break detecting unit has detected a break of the main reception cable 43. The power feeding equipment 52 is connected to a power supply line 65. This power supply line 65 is laid in the land portion and is bundled in the underwater cable 47 together with optical fiber cables at the beach manhole 42.

Figure 3:
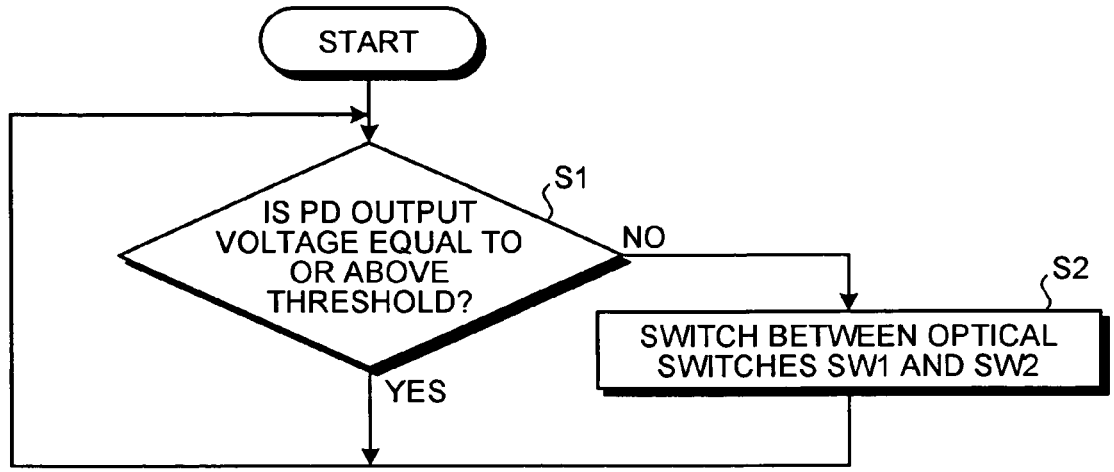
FIG. 3 is a flowchart of a control by a controlling unit of the optical submarine transmission system according to the first embodiment.
Figure 4:
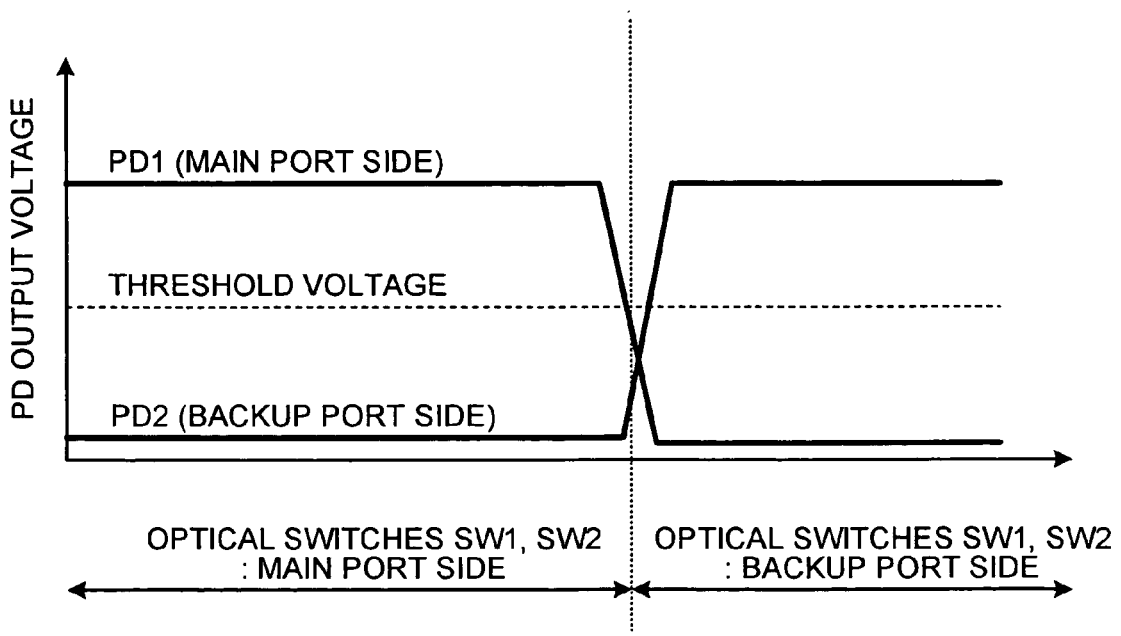
FIG. 4 is a schematic for explaining switching timing in switching optical switches by the controlling unit of the optical submarine transmission system according to the first embodiment.

FIG. 3 is a flowchart of a control performed by the controlling unit. FIG. 4 is a schematic for explaining switching timing of the optical switches controlled by the controlling unit. When no fault has occurred to the main reception cable 43, a main signal output from the transmitter 54 is provided to the main port of the second optical switch 62 through the variable optical attenuator 63. The main signal is input into the second optical coupler 49 of the beach manhole 42 passing through the second optical attenuator 61 and the main transmission cable 44, and is input into the transmission cable of the underwater cable 47.

On the other hand, a main signal output from the reception cable of the underwater cable 47 is divided into two at the first optical coupler 48 of the beach manhole 42 and is input respectively into the main reception cable 43 and the backup reception cable 45. A divided main signal traveling through the main reception cable 43 is divided into two at the third optical coupler 55 of the land terminal station 41 and is provided respectively to the first photodiode 56 and the first optical attenuator 57. The divided main signal provided to the first optical attenuator 57 is received by the receiver 53 through the main port of the first optical switch 58.

The first photodiode 56 generates a voltage by photoelectrically converting the divided main signal provided from the third optical coupler 55. The controlling unit 64 compares an output voltage of the first photodiode 56 with a threshold (step S1). When the output voltage is equal to or higher than the threshold (step S1: YES), the controlling unit 64, having determined that the main reception cable 43 is normal, continues to monitor the main reception cable 43 based on the output voltage of the first photodiode 56.

If the output voltage of the first photodiode 56 is lower than the threshold (step S1: NO), the controlling unit 64, having determined that the main reception cable has broken, outputs a switching controlling signal to the first optical switch 58 and the second optical switch 62 (step S2). The first optical switch 58 switches the counterpart to be connected to the receiver 53 from the main port to the backup port. The second optical switch 62 switches the counterpart to be connected to the transmitter 54 through the variable optical attenuator 63 from the main port to the backup port (see FIG. 4). FIG. 4 is a schematic for explaining switching timing of the optical switches by the controlling unit of the optical submarine transmission system. When switching to the backup port, the controlling unit 64 first sets the attenuation amount of the variable optical attenuator 63 at the maximum and gradually reduces the attenuation amount to prevent the terminal station apparatus of the receiving side from being broken by an optical surge.

Having been switched from the main port to the backup port, the main signal output from the transmitter 54 is input into the transmission cable of the underwater cable 47 through the backup transmission cable 46. The main signal output from the reception cable of the underwater cable 47 is received by the receiver 53 through the backup reception cable 45. During this, the main signal passing through the backup reception cable 45 is divided at the fourth optical coupler 59 and is also provided to the second photodiode 60.

The second photodiode 60 generates a voltage by photoelectrically converting the divided main signal. The controlling unit 64 monitors the state of the backup reception cable 45 by comparing an output voltage of the second photodiode 60 with the threshold. When the output voltage is equal to or higher than the threshold, the backup reception cable 45 is normal. The controlling unit 64 determines that a fault has occurred in the backup reception cable 45 when detecting that the output voltage is lower than the threshold.

According to the first embodiment, only small-sized passive parts, such as the optical couplers 48 and 49, are provided in the beach manhole 42. Therefore, even when the beach manhole 42 is small and no commercial power supply is available, a break of a cable in the land portion can be detected on the side of the land terminal station 41 and the optical transmission path can be automatically switched to the backup line side. Thus, the line in the land portion can be configured to be redundant. According to the first embodiment, a break of the main reception cable 43 and a break of the backup reception cable 45 occurred independently can be detected.

Assuming that cables are broken on the transmitting side and the receiving side at the same time, breaks of the main reception cable 43 and the main transmission cable 44, and the breaks of the backup reception cable 45 and the backup transmission cable 46 can be detected. According to the first embodiment, the redundant configuration of the land portion can be realized at a low cost because the configuration of the land terminal station 41 and the configuration of the beach manhole 42 are simple. For an existing optical submarine transmission system, the redundant configuration can be realized by newly laying the backup reception cable 45 and the backup transmission cable 46 in the land portion; adding the first and the second optical couplers 48, 49 to the beach manhole; and adding the third and the fourth optical couplers 55, 59, the first and the second photodiodes 56, 60, the first and the second optical attenuators 57, 61, the first and the second optical switches 58, 62, the variable optical attenuator 63, and the controlling unit 64 to the land terminal station.

Figure 5:
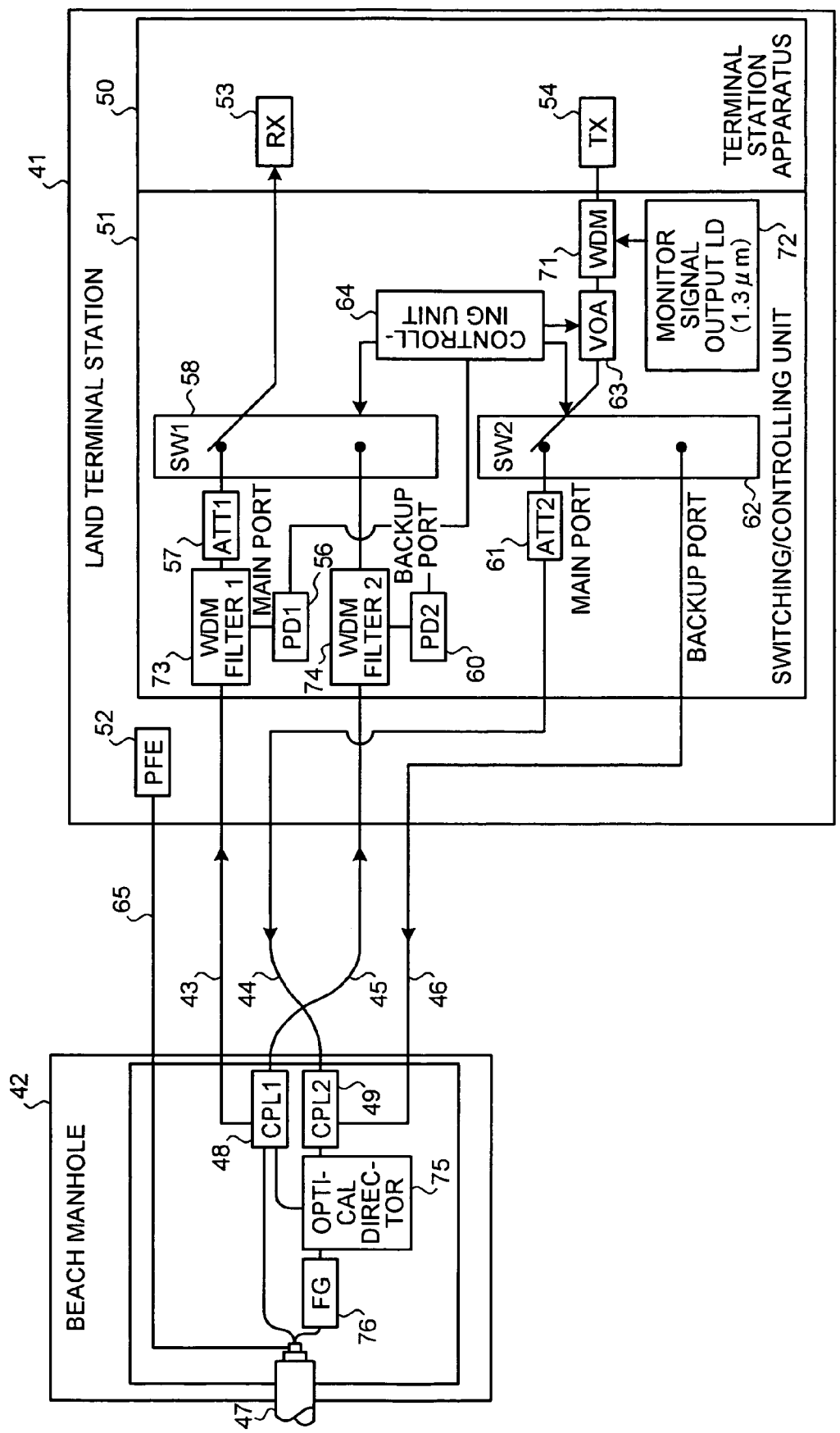
FIG. 5 is a block diagram of a configuration of a land portion in an optical submarine transmission system according to a second embodiment of the present invention.

FIG. 5 is a block diagram of a configuration of a land portion in an optical submarine transmission system according to a second embodiment. As shown in FIG. 5, according to the second embodiment, the main reception cable 43 is monitored using a monitor signal having a wavelength different from that of the main signal.

As shown in FIG. 5, in the land terminal station 41, a wavelength division multiplexer (WDM) 71 is connected between the transmitter 54 and the variable optical attenuator 63. This wavelength division multiplexer 71 is connected to a monitor signal output laser diode (LD) 72. A main signal output from the transmitter 54 and a monitor signal output from the monitor signal output laser diode 72 are multiplexed in the wavelength division multiplexer 71 and sent to the beach manhole 42. Not especially limited, however, the wavelength of the monitor signal output from the monitor signal output laser diode 72 is, for example, 1.3 µm.

In the land terminal station 41, a first optical demultiplexer (WDM filter 1) 73 and a second optical demultiplexer (WDM filter 2) 74 are provided instead of the third optical coupler 55 and the fourth optical coupler 59 respectively. The first optical demultiplexer (WDM filter 1) 73 and the second optical demultiplexer (WDM filter 2) 74 separate a signal obtained by multiplexing the main signal and the monitor signal sent respectively from the main reception cable 43 and the backup reception cable 45 into the main signal and the monitor signal.

In the beach manhole 42, an optical director 75 and a fiber grating (FG) 76 are connected in this order between the second optical coupler 49 and the underwater cable 47. The fiber grating 76 reflects the monitor signal in the signal obtained by multiplexing the main signal and the monitor signal having passed through the second optical coupler 49 and the optical director 75, back to the optical director 75; passes only the main signal; and inputs the main signal into the underwater cable 47.

The optical director 75 inputs the monitor signal returned from the fiber grating 76 into the first optical coupler 48. The monitor signal input into the first optical coupler 48 is multiplexed with the main signal sent from the underwater cable 47 and is sent to the land terminal station 41. Because the remaining portion of the configuration is same as that of the first embodiment, the configuration same as that of the first embodiment is given the same reference numeral, and explanation is omitted.

Figure 6:
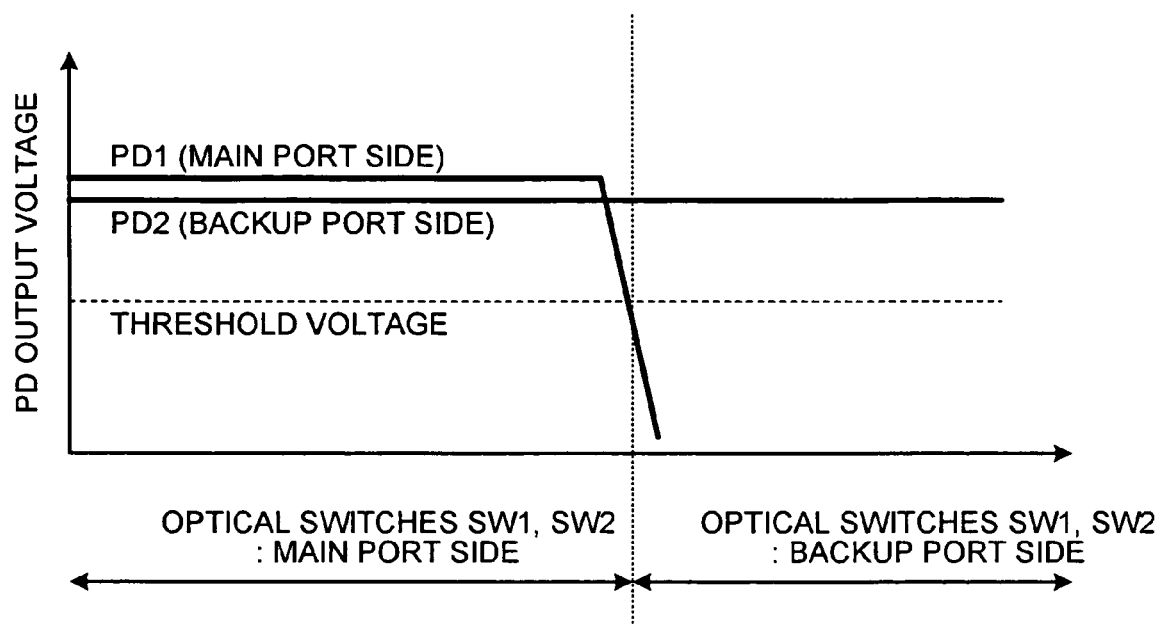
FIG. 6 is a schematic for explaining switching timing in switching optical switches by the controlling unit of the optical submarine transmission system according to the second embodiment.

FIG. 6 is an explanatory view of the switching timing of the optical switches by the controlling unit. When no fault has occurred to the main reception cable 43, a signal obtained by multiplexing in the wavelength division multiplexer 71 a main signal output from the transmitter 54 and a monitor signal output from the monitor signal output laser diode 72, is provided to the main port of the second optical switch 62 through the variable optical attenuator 63.

This multiplexed signal is input into the second optical coupler 49 of the beach manhole 42 through the second optical attenuator 61 and the main transmission cable 44, passes through the optical director 75, and reaches the fiber grating 76. In the multiplexed signal, the main signal is input into the transmission cable of the underwater cable 47 through the fiber grating 76. The monitor signal is reflected by the fiber grating 76 back to the optical director 75 and is input into the first optical coupler 48.

In the first optical coupler 48, the monitor signal is multiplexed with the main signal output from the reception cable of the underwater cable 47 and is sent to the land terminal station 41 through the main reception cable 43 and the backup reception cable 45. The signal passing through the main reception cable 43 is separated in the first optical demultiplexer 73 of the land terminal station 41 into the main signal and the monitor signal. The separated main signals pass through the first optical attenuator 57 and the main port of the first optical switch 58 to be received by the receiver 53. The separated monitor signal is provided to the first photodiode 56. The first photodiode 56 generates a voltage by photo-electrically converting the monitor signal.

The controlling unit 64 controls switching of the first and the second optical switches 58 and 62, and controls attenuation by the variable optical attenuator 63 by comparing the output voltage of the first photodiode 56 with the threshold in a similar manner as in the first embodiment. Therefore, the control of the controlling unit 64 is as in the flowchart shown in FIG. 3. The relation between the state of variation of output voltages of the first and the second photodiodes 56 and 60, and the switching timing of the first and the second optical switches 58 and 62 is as shown in FIG. 6.

The ports of the first and the second optical switches 58 and 62 are switched from the main ports to the backup ports by the controlling unit 64. Thus, the signal obtained by multiplexing, in the wavelength division multiplexer 71, the main signal output from the transmitter 54 and the monitor signal output from the monitor signal output laser diode 72 is transmitted to the beach manhole 42 through the backup transmission cable 46. In the beach manhole 42, in the multiplexed signal, the main signal is input into the transmission cable of the underwater cable 47 through the optical director 75 and the fiber grating 76.

The monitor signal is reflected by the fiber grating 76, passes through the optical director 75, is multiplexed in the first optical coupler 48 with the main signal sent from the underwater cable 47, passes through the backup reception cable 45, and is input into the second optical demultiplexer 74 of the land terminal station 41. In the signal input into the second optical demultiplexer 74, the main signal is received by the receiver 53. The monitor signal is photo-electrically converted by the second photodiode 60. The controlling unit 64 monitors the state of the backup reception cable 45 and learns that a fault has occurred to the backup reception cable 45 based on the output voltage of the second photodiode 60, in a similar manner as in the first embodiment.

According to the second embodiment, small-sized passive parts, such as the optical couplers 48 and 49, the optical director 75, and the fiber grating 76, are provided in the beach manhole 42. Therefore, similarly to the first embodiment, the line in the land portion can be configured to be redundant. By using the monitor signal, the cables in the land portion can be monitored without influencing the main signal. According to the second embodiment, a break of the main reception cable 43, a break of the main transmission cable 44, and a break of the backup reception cable 45 occurred independently, breaks of the main reception cable 43 and the main transmission cable 44 occurred at the same time, and breaks of the backup reception cable 45 and the backup transmission cable 46 occurred at the same time can be detected.

The redundant configuration according to the second embodiment can also be realized for in an existing optical submarine transmission system. In such a case, the backup reception cable 45 and the backup transmission cable 46 are newly laid in a land portion; a beach manhole needs to be added only with the first and the second optical couplers 48, 49, the optical director 75, and the fiber grating 76; and a land terminal station needs to be added only with the first and the second photodiodes 56, 60, the first and the second optical attenuators 57, 61, the first and the second optical switches 58, 62, the variable optical attenuator 63, the controlling unit 64, the wavelength division multiplexer 71, the monitor signal output laser diode 72, and the first and the second optical demultiplexers 73, 74.

Figure 7:
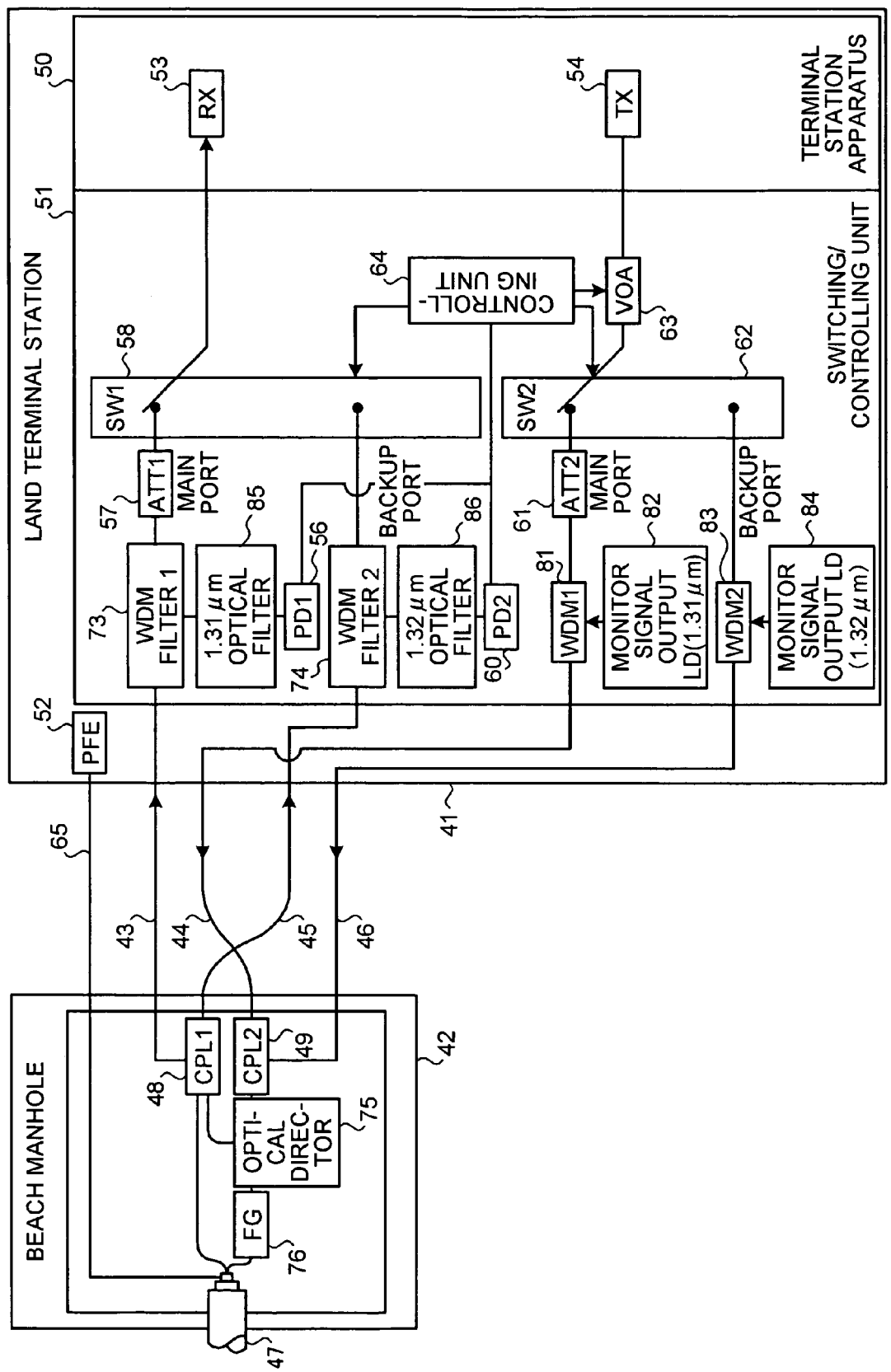
FIG. 7 is a block diagram of a configuration of a land portion in an optical submarine transmission system according to a third embodiment of the present invention.

FIG. 7 is a block diagram of a configuration of a land portion in an optical submarine transmission system according to a third embodiment. As shown in FIG. 7, in the third embodiment, monitoring of the main reception cable 43 and the backup reception cable 45 is executed independently using two monitor signals each having a wavelength different from that of the main signal and from each other.

In the land terminal station 41, a wavelength division multiplexer (WDM1) 81 is connected between the second optical attenuator 61 and the main transmission cable 44. This first wavelength division multiplexer 81 is connected to a first monitor signal output laser diode (LD) 82. When the main port is selected at the second optical switch 62, the main signal output from the transmitter 54 and a first monitor signal output from the first monitor signal output laser diode 82 are multiplexed in the first wavelength division multiplexer 81 and sent to the beach manhole 42. When the backup port is selected in the second optical switch 62, the first monitor signal output from the first monitor signal output laser diode 82 is sent to the beach manhole 42 through the first wavelength division multiplexer 81. Not especially limited, however, the wavelength of the first monitor signal is, for example, 1.31 μm.

In the land terminal station 41, a second wavelength division multiplexer (WDM2) 83 is connected between the backup port of the second optical switch 62 and the backup transmission cable 46. This second wavelength division multiplexer 83 is connected to a second monitor signal output laser diode (LD) 84. When the main port is selected in the second optical switch 62, a second monitor signal output from the second monitor signal output laser diode (LD) 84 is sent to the beach manhole 42 through the second wavelength division multiplexer 83. When the backup port is selected in the second optical switch 62, the main signal output from the transmitter 54 and a second monitor signal output from the second monitor signal output laser diode 84 are multiplexed in the second wavelength division multiplexer 83 and sent to the beach manhole 42. Not especially limited, however, the wavelength of the second monitor signal is, for example, 1.32 μm.

In the land terminal station 41, the first optical demultiplexer (WDM filter 1) 73 and the second optical demultiplexer (WDM filter 2) 74 are provided instead of the third optical coupler 55 and the fourth optical coupler 59 respectively. The first optical demultiplexer (WDM filter 1) 73 and the second optical demultiplexer (WDM filter 2) 74 separate a signal obtained by multiplexing the main signal, the first monitor signal, and the second monitor signal sent respectively from the main reception cable 43 and the backup reception cable 45 into the main signal, the first monitor signal, and the second monitor signal.

A 1.31 μm optical filter 85 is connected between the first optical demultiplexer 73 and the first photodiode 56. This 1.31 μm optical filter 85 is a band-pass filter for a narrow band that only passes the light having a wavelength of 1.31 μm. Therefore, only the first monitor signal having the wavelength of 1.31 μm of the first and the second monitor signals separated from the main signal in the first optical demultiplexer 73 passes through the 1.31 μm optical filter 85 and is received by the first photodiode 56.

A same process is applied to the backup port. A 1.32 μm optical filter 86 that is a band-pass filter for a narrow band and only passes the light having a wavelength of 1.32 μm is connected between the second optical demultiplexer 74 and the second photodiode 60. Due to this 1.32 μm optical filter 86, only the second monitor signal having the wavelength of 1.32 μm of the first and the second monitor signals separated from the main signal in the second optical demultiplexer 74 is received by the second photodiode 60.

In the beach manhole 42, similarly to the second embodiment, the optical director 75 and the fiber grating (FG) 76 are provided. The fiber grating 76 reflects the first monitor signal and the second monitor signal in the signal obtained by multiplexing the main signal, the first monitor signal, and the second monitor signal, back to the optical director 75, passes only the main signal, and inputs the main signal into the underwater cable 47.

The optical director 75 inputs the first and the second monitor signals returned from the fiber grating 76 into the first optical coupler 48. The first and the second monitor signals input into the first optical coupler 48 are multiplexed with the main signal sent from the underwater cable 47 and are sent to the land terminal station 41. Because the remaining portion of the configuration is same as that of the first embodiment, the configuration same as that of the first embodiment is given the same reference numeral, and explanation is omitted.

Figure 8:
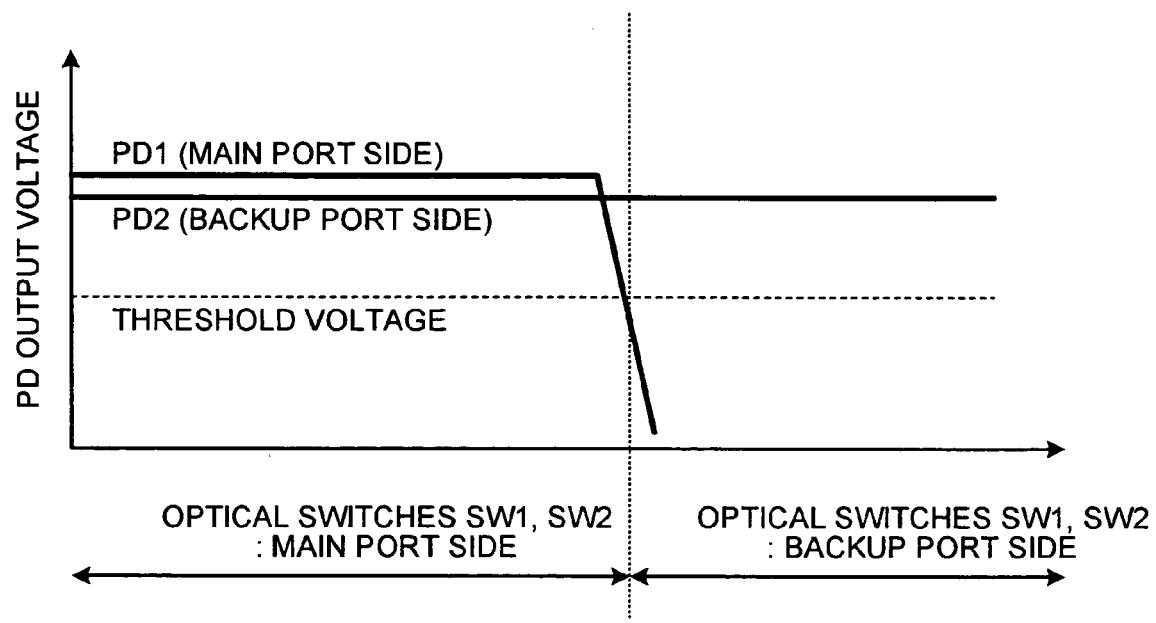
FIG. 8 is a schematic for explaining switching timing in switching optical switches by the controlling unit of the optical submarine transmission system according to the third embodiment.
Figure 9:
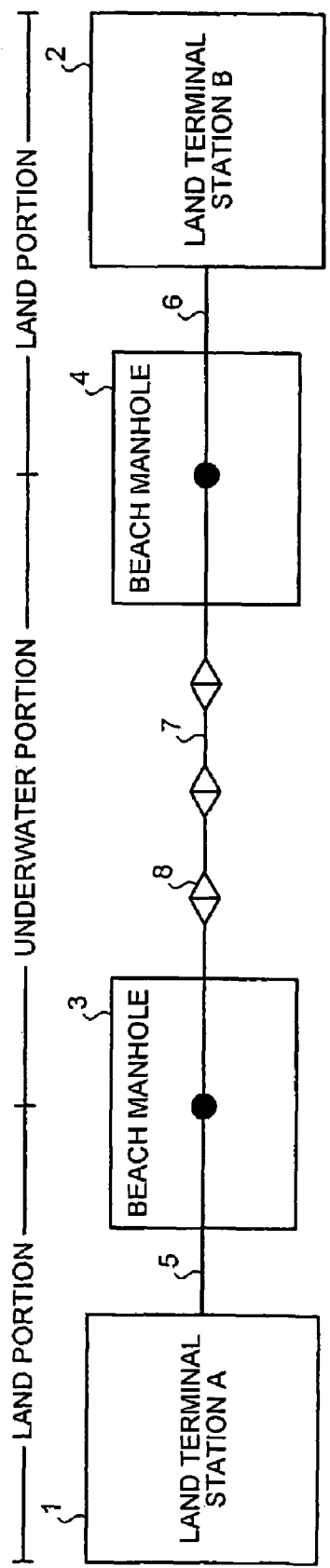
FIG. 9 is a schematic of a conventional optical submarine transmission system.
Figure 10:
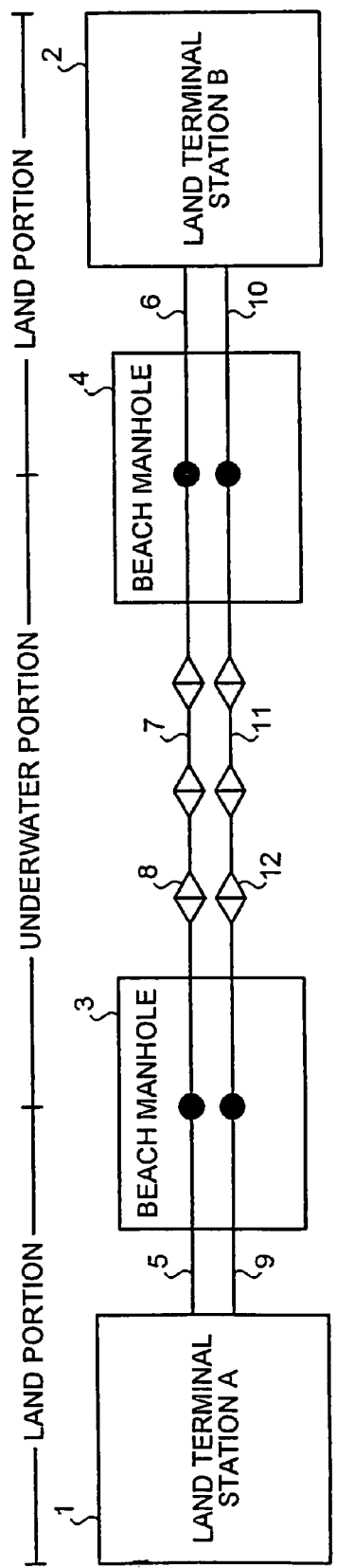
FIG. 10 is a schematic of an optical submarine transmission system formed fully duplex.

FIG. 8 is a schematic for explaining switching timing of the optical switches by the controlling unit. When no fault has occurred to the main reception cable 43, a main signal output from the transmitter 54 and having passed through the variable optical attenuator 63 and the main port of the second optical switch 62, and the first monitor signal input from the first monitor signal output laser diode 82 are multiplexed in the first wavelength division multiplexer (WDM1) 81.

This multiplexed signal is input into the second optical coupler 49 of the beach manhole 42 through the main transmission cable 44. The second monitor signal output from the second monitor signal output laser diode 84 is input into the second optical coupler 49 through the backup transmission cable 46, and is multiplexed with the main signal and the second monitor signal. The signal obtained by multiplexing the main signal, the first monitor signal, and the second monitor signal, passes through the optical director 75 and reaches the fiber grating 76. In the multiplexed signal, the main signal passes through the fiber grating 76 and is input into the transmission cable of the underwater cable 47. The first and the second monitor signals are reflected by the fiber grating 76 back to the optical director 75 and are input into the first optical coupler 48.

In the first optical coupler 48, the first and the second monitor signals are multiplexed with the main signal output from the reception cable of the underwater cable 47 and are sent to the land terminal station 41 through the main reception cable 43 and the backup reception cable 45. The signal passing through the main reception cable 43 is separated in the first optical demultiplexer 73 of the land terminal station 41 into the main signal, the first monitor signal, and the second monitor signal. The separated main signal passes through the first optical attenuator 57 and the main port of the first optical switch 58 and is received by the receiver 53. The separated first and the second monitor signals are input into the 1.31 μm optical filter 85 and only the first monitor signal passes through this filter and is provided to the first photodiode 56. The first photodiode 56 generates a voltage by photo-electrically converting the first monitor signal.

The controlling unit 64 controls switching of the first and the second optical switches 58 and 62 and controls attenuation by the variable optical attenuator 63 by comparing the output voltage of the first photodiode 56 with the threshold, in a similar manner as the first embodiment. Therefore, the control of the controlling unit 64 is as in the flowchart shown in FIG. 3. The relation between the state of variation of output voltages of the first and the second photodiodes 56, 60, and the switching timing of the first and the second optical switches 58, 62 is as shown in FIG. 8.

The ports of the first and the second optical switches 58 and 62 are switched from the main ports to the backup ports by the controlling unit 64. Thus, the main signal output from the transmitter 54 and the second monitor signal output from the second monitor signal output laser diode 84 are multiplexed in the second wavelength division multiplexer 83. This multiplexed signal is input into the second optical coupler 49 of the beach manhole 42 through the backup transmission cable 46. When no fault has occurred to the main transmission cable 44, the first monitor signal output from the first monitor signal output laser diode 82 is input into the second optical coupler 49 through the main transmission cable 44, and is multiplexed with the main signal and the second monitor signal.

The signal obtained by multiplexing the main signal, the first monitor signal, and the second monitor signal reaches the fiber grating 76 through the optical director 75. In the multiplexed signal, the main signal is input into the transmission cable of the underwater cable 47 through the fiber grating 76. The first monitor signal and the second monitor signal are reflected by the fiber grating 76 back to the optical director 75 and are multiplexed in the first optical coupler 48 with the main signal output from the reception cable of the underwater cable 47.

The signal obtained by multiplexing the main signal, the first monitor signal, and the second monitor signal is input into the second optical demultiplexer 74 of the land terminal station 41 through the backup reception cable 45 and is separated into the main signal, the first monitor signal, and the second monitor signal. The separated main signal is received by the receiver 53 through the backup port of the first optical switch 58. The separated first and second monitor signals are input into the 1.32 μm optical filter 86 and only the second monitor signal is provided to the second photodiode 60 through this filter. The second photodiode 60 photo-electrically converts the second monitor signal and generates a voltage. The controlling unit 64 monitors the state of the backup reception cable 45 and learns that a fault has occurred to the backup reception cable 45 based on the output voltage of the second photodiode 60, in a similar manner as the first embodiment.

According to the third embodiment, only small-sized passive parts, such as the optical couplers 48, 49, the optical director 75, and the fiber grating 76, are provided in the beach manhole 42. Therefore, similarly to the first embodiment, the line in the land portion can be configured to be redundant. By using the monitor signals, the cables in the land portion can be monitored without influencing the main signal. According to the third embodiment, a break of the main reception cable 43, a break of the main transmission cable 44, a break of the backup reception cable 45, and a break of the backup transmission cable 46 occurred independently, breaks of the main reception cable 43 and the main transmission cable 44 occurred at the same time, and breaks of the backup reception cable 45 and the backup transmission cable 46 occurred at the same time can be detected.

The redundant configuration according to the third embodiment can also be realized in an existing optical submarine transmission system. In such a case, the backup reception cable 45 and the backup transmission cable 46 are newly laid in a land portion; a beach manhole needs to be added only with the first and the second optical couplers 48, 49, the optical director 75, and the fiber grating 76; and a land terminal station needs to be added only with the first and the second photodiodes 56, 60, the first and the second optical attenuators 57, 61, the first and the second optical switches 58, 62, the variable optical attenuator 63, the controlling unit 64, the first and the second optical demultiplexers 73, 74, the first and the second wavelength division multiplexer 81, 83, the first and the second monitor signal output laser diodes 82, 84, the 1.31 μm optical filter 85, and the 1.32 μm optical filter 86.

According to the embodiments described above, a line in a land portion between a beach manhole and a land terminal station in an optical submarine transmission system can be configured to be duplex.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical submarine transmission system comprising:
    a main line cable laid between a land terminal station and a beach manhole, and connected to an underwater cable in the beach manhole;
    a backup line cable laid between the land terminal station and the beach manhole in a different route from a route in which the main line cable is laid, and connected to the underwater cable in the beach manhole;
    a break detecting unit arranged in the land terminal station, and configured to detect a break of the main line cable; and
    a path switching unit arranged in the land terminal station, and configured to switch an optical transmission path from the main line cable to the backup line cable when the break detecting unit detects the break, wherein
    the beach manhole includes only passive parts that are capable of operating without a power supply.

2. The optical submarine transmission system according to claim 1, wherein each of the main line cable and the backup line cable, includes a reception cable and a transmission cable in pair, the reception cable configured to transmit a main signal from the beach manhole to the land terminal station, the transmission cable configured to transmit the main signal from the land terminal station to the beach manhole.

3. The optical submarine transmission system according to claim 2, wherein the beach manhole includes
    an optical dividing unit configured to divide the main signal transmitted from the underwater cable into a signal to be transmitted to the reception cable of the main line cable and a signal to be transmitted to the reception cable of the backup line cable; and
    an optical coupling unit configured to couple the transmission cable of the main line cable and the transmission cable of the backup line cable with the underwater cable.

4. The optical submarine transmission system according to claim 3, wherein the break detecting unit is configured to detect the break based on a received-light level of the main signal transmitted from the underwater cable through the reception cable of the main line cable.

5. The optical submarine transmission system according to claim 3, wherein the break detecting unit is further configured to detect a break of the backup line cable based on a received-light level of the main signal transmitted from the underwater cable through the reception cable of the backup line cable.

6. The optical submarine transmission system according to claim 3, wherein the break detecting unit is configured to output a monitor signal having a wavelength different from that of the main signal, to the beach manhole through the transmission cable of the main line cable, and to detect the break based on a received-light level of output monitor signal that has been reflected by the beach manhole to be returned through the reception cable of the main line cable.

7. The optical submarine transmission system according to claim 6, wherein the break detecting unit is further configured to detect a break of the backup line cable based on a received-light level of transmitted monitor signal that has been reflected by the beach manhole to be returned through the reception cable of the backup line cable.

8. The optical submarine transmission system according to claim 6, wherein the beach manhole further includes a fiber grating configured to pass the main signal and to reflect the monitor signal.

9. The optical submarine transmission system according to claim 8, wherein the beach manhole further includes an optical director configured to control the monitor signal reflected by the fiber grating to be input to the optical dividing unit.

10. The optical submarine transmission system according to claim 3, wherein the break detecting unit is configured to output a first monitor signal having a wavelength different from that of the main signal, to the beach manhole through the transmission cable of the main line cable, and to detect the break based on a received-light level of output first monitor signal that has been reflected by the beach manhole to be returned through the reception cable of the main line cable, and to output a second monitor signal having a wavelength different from that of the main signal and that of the first monitor signal, to the beach manhole through the transmission cable of the backup line cable, and to detect a break of the backup line cable based on a received-light level of output second monitor signal that has been reflected by the beach manhole to be returned through the reception cable of the backup line cable.

11. The optical submarine transmission system according to claim 10, wherein the beach manhole further includes a fiber grating configured to pass the main signal and to reflect the first monitor signal and the second monitor signal.

12. The optical submarine transmission system according to claim 11, wherein the beach manhole further includes an optical director configured to control the first monitor signal and the second monitor signal that have been reflected by the fiber grating to be input to the optical dividing unit.

13. The optical submarine transmission system according to claim 2, wherein the path switching unit includes an optical switch configured to switch from the reception cable and the transmission cable of the main line cable to the reception cable and the transmission cable of the backup line cable.

14. An optical submarine transmission system comprising:
   a main line cable laid between a land terminal station and a beach manhole and carrying a main signal;
   a backup line cable laid between the land terminal station and the beach manhole in a different route from a route in which the main line cable is laid;
   a break detecting unit arranged in the land terminal station, and configured to detect a break of the main line cable; and
   a path switching unit arranged in the land terminal station, and configured to switch an optical transmission path of the main signal from the main line cable to the backup line cable when the break detecting unit detects the break, wherein
   the break detecting unit is configured to output a monitor signal having a wavelength different from that of the main signal, to the beach manhole through a transmission cable of the main line cable, and to detect the break based on a received-light level of the output monitor signal that has been reflected by the beach manhole to be returned through a reception cable of the main line cable.

* * * * *

UNITED STATES PATENT AND TRADEMARK OFFICE
CERTIFICATE OF CORRECTION

PATENT NO. : 7,326,916 B2 Page 1 of 1
APPLICATION NO. : 11/394114
DATED : February 5, 2008
INVENTOR(S) : Akira Sugiyama et al.

It is certified that error appears in the above-identified patent and that said Letters Patent is hereby corrected as shown below:

Column 12, Line 21 Claim 2, change "cable," to --cable--.

Signed and Sealed this

Eighth Day of July, 2008

JON W. DUDAS
*Director of the United States Patent and Trademark Office*